W. A. WEISS.
LATHE CHUCK.
APPLICATION FILED JAN. 3, 1914.
1,095,304.
Patented May 5, 1914.
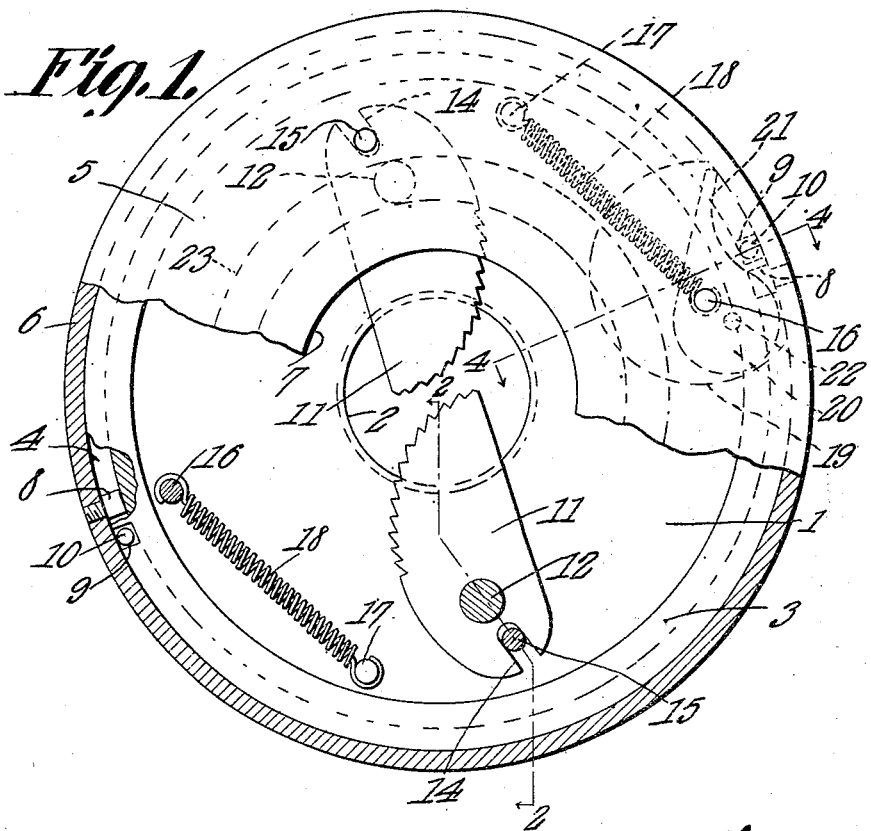
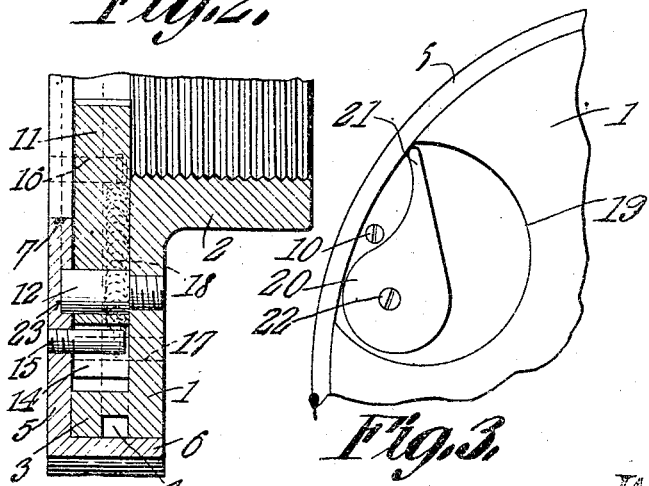
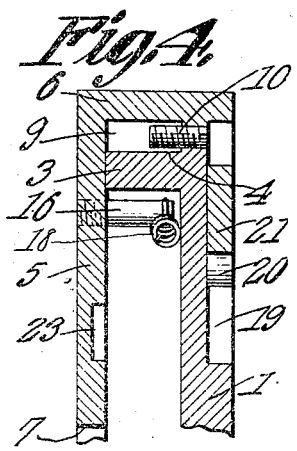
Witnesses
W. A. Weiss, Inventor
by Cachow & Co.
Attorneys

UNITED STATES PATENT OFFICE.

WILLARD A. WEISS, OF NEEDLES, CALIFORNIA.

LATHE-CHUCK.

1,095,304.  Specification of Letters Patent.  Patented May 5, 1914.

Application filed January 3, 1914. Serial No. 810,220.

*To all whom it may concern:*

Be it known that I, WILLARD A. WEISS, a citizen of the United States, residing at Needles, in the county of San Bernardino and State of California, have invented a new and useful Lathe-Chuck, of which the following is a specification.

The present invention appertains to a lathe chuck, and aims to provide a novel and improved contrivance of that character.

It is the object of the present invention to provide a lathe chuck of unique construction, which will readily receive and effectively engage work of various contours or cross sections, and work of various diameters or sizes within certain limits, the present device being adapted to supplant the ordinary face plate and lathe dog which are in prevailing use.

Another object of the present invention is to provide a lathe chuck of the nature indicated, which will be safe in its use, the same not having any encumbering projections upon its exterior, which would be liable to catch the clothes of the operator, or other adjoining parts.

Another object of the present invention is to provide a chuck of the nature specified embodying a novel assemblage of component parts, whereby the several parts may be readily assembled and separated for purposes of repair, readjustment, replacement or cleaning.

A further object of the present invention is to provide a lathe chuck embodying pivoted or movably mounted jaws or dogs which are arranged to be quickly and conveniently opened for receiving the work, and which are adapted to effectively engage the work to rotate the same with the lathe spindle.

A still further object of the present invention is to provide in a lathe chuck of the nature indicated, locking means for retaining the dogs or jaws at any positions, to which they have been set, whereby pipes or other work or like diameters may be readily engaged to and removed from the chuck without the necessity of repeatedly adjusting the jaws or dogs.

It is also within the spirit of the present invention to provide a lathe chuck of comparatively simple, durable, substantial, compact, light and inexpensive structure, which will embody a minimum number of movable parts, and which shall be simple, convenient, practical and efficient in its use.

With the foregoing and other objects in view, which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawings, wherein:—

Figure 1 is a face view of the improved chuck, portions being broken away. Fig. 2 is a sectional detail taken on the line 2—2 of Fig. 1. Fig. 3 is a fragmental rear or back view illustrating the locking means. Fig. 4 is a sectional detail taken on the line 4—4 of Fig. 1.

In carrying out the present invention, the improved chuck embodies a circular back or body plate 1 having the central rearwardly projecting boss or collar 2 arranged to be threaded over the usual lathe spindle. The back plate 1 is provided with a marginal flange or rim 3 projecting forwardly, and provided with an annular or peripheral groove 4. A face or cover plate 5 of circular contour, is disposed in front of the back plate 1 and rests against the rim 3 of the back plate, the face plate 5 having a marginal or peripheral flange or rim 6 snugly embracing the periphery and rim 3 of the back plate, to mount the face plate for rotatory or oscillatory movements upon the back plate. The face plate 5 is provided with a central or concentric opening 7 of sufficient diameter to receive the various sizes of work to which the particular size of the chuck is adapted. As a means for assembling the two plates and locking them together for oscillatory adjustments relative to each other, one or more screws or lugs 8 are secured to the flange or rim 6 of the face plate so as to project inwardly to be received by the groove 4 of the back plate rim, the said rim 3 being provided with one or more slots 9 extending forwardly from the groove 4 to receive the lug or lugs 8. As illustrated, a pair of diametrically opposite lugs 8 and slots 9 are provided, although they may be of any number or arrangement, as may be desired or necessary. Thus, when the face plate is applied to the back plate, the lugs 8 may pass through the slots 9 so as to be moved in alinement with the groove 4 to enter the same when the face plate is turned relative to the back plate. Stop screws 10 are threaded through the peripheral portion of the back plate 1 so as to project into the groove 4 in alinement with the slots 9, whereby the lugs 8 will be prevented from alining with the slots 9. Thus, the face plate is locked to the back plate in an effective and simple manner, the stops 10 limiting the movement of the face plate in one direction, but permitting the face plate to be swung in the other or opposite direction.

Between the face and back plates, which are spaced apart and parallel, is disposed a pair of diametrically opposite jaws or dogs 11 fulcrumed or pivoted upon fulcrum or pivot pins 12 threadedly or otherwise engaged to the back plate 1 intermediate the center and periphery of the said back plate. The jaws or dogs 11 are formed with coöperating toothed cam faces at their inner ends, which project beyond the edge of the opening 7 of the face plate to receive the work or stock therebetween. The jaws or dogs 11 are fulcrumed intermediate their ends to the pins or pintles 12, and the outer ends or arms of the dogs or jaws are provided with open slots 14 extending radially from the fulcrums and receiving pins or fingers 15 threadedly or otherwise engaged to the face plate 5. In this manner, the jaws or dogs are operatively connected to the face plate, it being observed that the jaws or dogs are pivoted to the back plate, in order that when the face plate is swung in the proper direction, the jaws or dogs will be swung apart at their inner or coöperating ends or arms, to permit the work or stock to be inserted therebetween.

As a means for returning the face plate and jaws or dogs to normal or initial position, two pairs of diametrically opposite pins 16 and 17 are threadedly or otherwise secured to the face plate and back plate respectively, so as to project within the space between the two plates, and coiled wire retractile springs 18 connect the respective pins 16—17 of the two pairs, in order that the face plate will be returned to normal or initial position, when it is free, the lugs 8 being brought against the stops 10. When the face plate is returned to initial or normal position, the coöperating toothed cam faces or ends of the jaws or dogs are adapted to swing close together, as seen in Fig. 1.

As a means for locking the face plate at any position to which it is set or swung, the back plate 1 is provided with a rear recess or depression 19 adjoining its periphery, and an eccentric or cam 20 is disposed within the recess or depression 19 flush with the rear side of the back plate 1, and is provided with a tangential lever or finger piece 21 also disposed within the depression or cavity 19, the eccentric or cam 20 being pivoted to the back plate by means of a pivot screw or fulcrum member 22. The eccentric 20 is so arranged, that when the face plate is swung to open the jaws or dogs, the eccentric may be frictionally engaged to the rim or flange 6 of the face plate to lock the face plate against retrograde movement. Thus, when the face plate is swung to any position, to open the jaws or dogs a predetermined extent, the eccentric or cam 20 may be so swung as to frictionally engage the rim of the face plate, to thereby lock the face plate in position, to prevent the same from returning to initial or normal position under the influence of the returning springs 18.

The face plate 5 is provided with an inner annular channel or race-way 23 receiving the free ends of the pins or pintles 12, to brace the same against flexing, should the same be subjected to any undue or extensive strains in the use of the chuck.

In practice, the present chuck is intended to replace the ordinary face plate of a lathe, the boss or collar 2 being readily threaded or secured upon the lathe spindle whereby the chuck may be made to rotate with the spindle. The present chuck is employed in connection with the usual centers for centering the work or stock, as usual. To engage the work to the chuck, the face plate 5 is swung, so as to open the jaws or dogs 11, whereby the end of the work or stock may be readily received between the jaws or dogs and may be properly centered, the jaws or dogs gripping or engaging the work or stock after the face plate is released or freed. Then, when the chuck is rotated with the lathe spindle, counter-clockwise as seen in Fig. 1, the work or stock will be rotated to be acted upon by the proper tools, the teeth of the cam faces of the dogs or jaws biting or gripping the work or stock to carry the same around with the chuck and spindle. In view of the fact that the present chuck is provided with the two diametrically opposite dogs or jaws, the chuck is capable of gripping objects or work of non-circular cross section or outline, as well as circular stock, which is highly desirable.

The work or stock may be readily removed from the chuck, by withdrawing it from between the jaws or dogs 11, or when this is not possible, the jaws or dogs may be opened by properly swinging the face plate. When the face plate is released or freed the same will return to initial or normal position to close the jaws or dogs, it being evident that as the face plate is oscillated, the pins 15 carried by the face plate working within the slots 14 of the dogs or jaws, will cause the dogs or jaws to swing or oscillate relative to the back plate so as to open and close within the opening 7 of the face plate through which the work or stock is projected. As the jaws or dogs swing relative to each other, the toothed cam faces thereof will be swung to and from each other, to increase or diminish the space between the jaws for gripping objects of various sizes and contours within certain limits, it being understood that the present chuck may be constructed in various sizes, according to the size of the work to be received and held thereby.

The jaws or dogs 11 are completely housed between the face and back plates, whereby they present no encumbering projections or protuberances, which might catch the clothes of the operator, and furthermore, the exterior of the present chuck is practically smooth and unencumbered to render the present chuck safe and convenient in its use. The dogs or jaws may be readily opened by rotating the face plate, no special tools or implements being necessary, such as wrenches, and the like. The jaws or dogs will be opened quickly and conveniently for receiving the work when the face plate is oscillated properly, and the jaws or dogs will be brought into effective engagement with the work as soon as the face plate is released, due to the fact that the springs 18 will partially return the face plate to initial position to swing the jaws or dogs against the work.

When it is desired to hold the jaws or dogs 11 at any position to which they are set, the eccentric or cam 20 may be swung into frictional engagement with the rim or flange 6 of the face plate, through the medium of the finger piece or lever 21, whereby the eccentric will lock or retain the face plate in its adjusted position, to thereby hold the jaws or dogs in place. In this manner, the work may be readily engaged to and removed from the chuck, without the necessity of repeatedly opening the dogs or jaws, this being particularly desirable for cutting threads upon pipes applied to the chuck.

From the foregoing, taken in connection with the drawing, the advantages and capabilities of the present invention will be apparent to those skilled in the art, and need not be further commented upon.

Having thus described the invention, what is claimed as new is:—

1. In a lathe chuck, a back plate attachable to a lathe spindle, an oscillatory face plate carried by the back plate and having a central work-receiving opening, fulcrum pins carried by the back plate, the face plate having an inner annular channel receiving the free ends of the said pins, work-engaging dogs fulcrumed upon the said pins, means carried by the face plate operatively connected to the dogs to oscillate the same when the face plate is oscillated relative to the back plate, and yieldable means connecting the said plates to swing the said dogs toward each other.

2. In a lathe chuck, back and face plates having overlapping rims, one rim having a peripheral groove, the other rim having a lug engaging the said groove, the first mentioned rim having a slot leading from the said groove to receive the lug when the plates are assembled, a removable stop carried by the first mentioned rim adjoining the said slot to prevent the lug from alining with the slot, and work engaging dogs disposed between the said plates, pivoted to the back plate and operatively connected to the face plate.

3. In a lathe chuck, a back plate attachable to a lathe spindle and having a marginal flange, a face plate having a central work-receiving opening and a marginal flange overlapping the aforesaid flange to mount the face plate for oscillatory movements upon the back plate, the flange of the back plate having a peripheral groove and slots leading from the said groove to the edge of the flange, lugs secured to the flange of the face plate and working within the said groove, removable stop screws threaded through the peripheral portion of the back plate in alinement with the said slots and projecting in the said groove, and work-engaging dogs disposed between the two plates, pivoted to the back plate, and operatively connected to the face plate.

4. In a lathe chuck, back and face plates, the back plate being attachable to a lathe spindle, the face plate having a central work-receiving opening, one of the plates having a rim overlapping the periphery of the other to mount the face plate for oscillatory movements relative to the back plate, and an eccentric pivoted to the other plate and coöperable with the said rim to frictionally engage the same, and work-engaging dogs disposed between the two plates, pivoted to the back plate, and operatively connected to the face plate.

5. In a lathe chuck, a back plate attachable to a lathe spindle, a face plate having a central work-receiving opening and having a marginal flange overlapping the periphery of the back plate to mount the face plate for oscillatory movements thereon, work-engaging dogs disposed between the two plates, pivoted to the back plate and operatively connected to the face plate, the back plate having a rear depression adjoining its periphery, and an eccentric pivoted within the said depression and cooperating with the said flange to frictionally engage the same for locking the face plate against retrograde movement when the dogs are opened.

In testimony that I claim the foregoing as my own, I have hereto affixed my signature in the presence of two witnesses.

WILLARD A. WEISS.

Witnesses:
 FREMONT D. SMITH,
 GEORGE R. WILSON.